United States Patent
Scherer

(10) Patent No.: US 7,972,021 B2
(45) Date of Patent: Jul. 5, 2011

(54) TRANSMISSION-CONTROLLED WINDOW GLAZING

(75) Inventor: Thomas Scherer, Hamburg (DE)

(73) Assignee: Airbus Deutschland GmbH (DE)

( * ) Notice: Subject to any disclaimer, the term of this patent is extended or adjusted under 35 U.S.C. 154(b) by 55 days.

(21) Appl. No.: 11/990,863

(22) PCT Filed: Aug. 23, 2006

(86) PCT No.: PCT/EP2006/008290
§ 371 (c)(1),
(2), (4) Date: Mar. 10, 2009

(87) PCT Pub. No.: WO2007/022972
PCT Pub. Date: Mar. 1, 2007

(65) Prior Publication Data
US 2009/0303567 A1    Dec. 10, 2009

(30) Foreign Application Priority Data
Aug. 23, 2005 (DE) .......................... 10 2005 039 838

(51) Int. Cl.
*G02B 7/18* (2006.01)
(52) U.S. Cl. ...................................... 359/512; 359/275
(58) Field of Classification Search .................. 359/275, 359/512
See application file for complete search history.

(56) References Cited

U.S. PATENT DOCUMENTS

| | | |
|---|---|---|
| 4,350,414 A | 9/1982 | Takahashi et al. |
| 2003/0169476 A1 | 9/2003 | Yoshimura |
| 2004/0206024 A1 | 10/2004 | Graf et al. |

FOREIGN PATENT DOCUMENTS

| | | |
|---|---|---|
| DE | 1079800 | 4/1960 |
| DE | 4440572 | 5/1996 |
| DE | 19631420 | 2/1998 |
| DE | 10141897 C1 | 4/2003 |
| EP | 0338876 | 10/1989 |
| GB | 640554 | 7/1950 |
| SU | 580186 A1 | 11/1977 |
| SU | 729147 A1 | 4/1980 |
| SU | 1219545 A1 | 3/1986 |
| WO | 03/021344 | 3/2003 |

OTHER PUBLICATIONS

Salinga, Thin Solid Films 414; 275 282 (2002).

*Primary Examiner* — Jack Dinh
(74) *Attorney, Agent, or Firm* — Lerner, David, Littenberg, Krumholz & Mentlik, LLP

(57) ABSTRACT

The invention relates to a window glazing comprising at least two window panes with an intermediate ventilated space arranged therebetween, wherein at least one window pane is provided with a layer which is arranged on the interior side therefore and whose transmission is controllable. More specifically, said invention relates to a multilayer glazing comprising corresponding intermediate spaces in which a sweeping gas circulates, wherein said sweeping gas consists of a mixture of air and other gaseous components in which the sweeping gas content is adjustable.

6 Claims, 3 Drawing Sheets

TRANSMISSION-CONTROLLED WINDOW GLAZING

CROSS-REFERENCE TO RELATED APPLICATIONS

This is a national phase entry under 35 U.S.C. §371 of International Application No. PCT/EP2006/008290 filed Aug. 23, 2006, published in German, which claims the benefit of the filing date of German Patent Application No. 10 2005 039 838.3 filed Aug. 23, 2005, the entire disclosures of each application are hereby incorporated herein by reference.

BACKGROUND OF THE INVENTION

The invention relates to a window glazing comprising at least two panes with a ventilated gap, wherein the inside of at least one of the panes is provided with a layer with a controllable transmission.

An internally ventilated glazing for airplanes is known from GB 640,554. This glazing consists of two panes consisting of glass or plastic, and mounted spaced apart. The resultant gap is flushed with dried air, so that the dual pane remains transparent under all temperature conditions encountered during operation.

Known from EP 0 338 876 B1 is an electrochrome glazing with variable transparency, which consists of two glass panes coated on the inside with a layer of electrochrome material. However, the glazing does no have a ventilated gap.

Electrochrome coatings for glass panes have been known for quite some time. One example would be the layer on a glass pane described in U.S. Pat. No. 4,350,414. However, no other indications are made with respect to generating a glazing with at least two panes that can be controlled with respect to transmission.

SUMMARY OF THE INVENTION

The object of the invention is to use simple means to expand the generation of flushing gas for the gap between two glass panes of a glazing in such a way as to achieve the composition of flushing gas necessary for operating the controllable transmission layer.

This object is achieved in a simple manner by linking the gap with a feed line for flushing gas, which is also connected with a mixing device, which can be used to adjust the composition of the flushing gas as needed. The flushing gas here consists of at least two components.

One of these components is air, to which portions of hydrogen or oxygen or portions of hydrogen together with oxygen are added. It is here especially advantageous if the required portions of hydrogen and oxygen are generated by an arrangement that makes up part of the device to which the glazing is applied. The device is usually a motor vehicle or airplane that has its own oxygen-generating system.

An electrolyte cell is especially well suited as a corresponding oxygen-generating system. The release of at least one of the two gaseous components, hydrogen and oxygen, generated by the electrolyte cell can here advantageously be controlled.

It is especially functional to arrange a device for drying the gas mixture either in the air feed line to the mixing device or feed line to the gap of the glazing. It is further advantageous to build a gas stream regulator in the air feed line to the mixing device.

In an alternative solution, an arrangement can be provided for supplying a plurality of similar window glazings with flushing gas, in which the feeding air and another gas are relayed via separate lines until reaching the area of the respective window glazing. Situated there is a regulator, which can be used to set both the mixing ratio of the two gaseous components of the flushing gas, as well as the quantity of flushing gas introduced into the respective window glazing. The further configuration of this model corresponds to the configuration of the first model already described above.

It is especially advantageous to use a window glazing described above in an airplane or motor vehicle.

The special advantage to the device according to the invention lies in the fact that the process of flushing the gap of multiple glazings with gas that is required during operation can be performed using simple means that are generally already present on board the motor vehicle or airplane anyway in such a way that the hydrogen required for operating the controllable transmission change of the glazing can also be easily provided and added to the flushing gas. Corresponding means can also be retrofitted with a justifiable outlay. In the case of an airplane, an onboard oxygen-generating system can be used, or the required hydrogen can alternatively also be generated with an electrolyte cell, for example.

The generation of hydrogen and/or its addition to the flushing gas is advantageously controlled by means of valves or other means that act in a similar way. At least one of the possible installation sites best has an arrangement for drying the flushing gas or the cabin air diverted for this purpose. It is also advantageous to incorporate a regulator for the gas stream in the feed line to the mixing device, in which the portion of air in the flushing gas is mixed with the hydrogen portion and/or the oxygen portion.

The application of window glazing according to the invention in an airplane or motor vehicle is viewed as particularly advantageous, since it enables a significant reduction in weight while using facilities already present on board, in particular those for oxygen generation.

BRIEF DESCRIPTION OF THE DRAWINGS

Preferred exemplary embodiments of the invention with additional configuration detail are depicted in the drawing in a schematically simplified manner, and will be described in greater detail below with reference to the drawings. Shown on.

DETAILED DESCRIPTION

Figure 1:
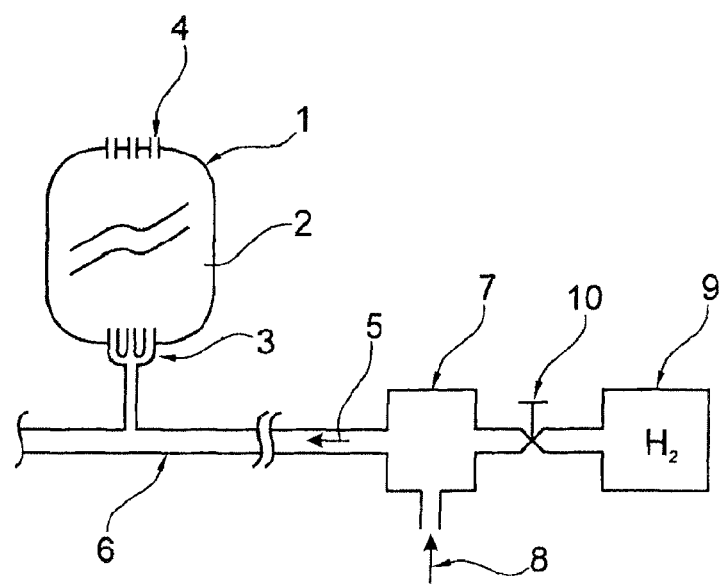
FIG. 1 is a device for supplying dual glazings with a flushing gas consisting of various components.

FIG. 1 depicts a simplified section through a window glazing, which in the exemplary embodiment comprises two panes that enclose a gap 2. It is also just as possible to use a multi-pane glazing in this location. The gap 2 additionally exhibits a number of openings 3 for introducing the flushing gas 5. A number of additional openings 4 are usually arranged on the opposite side to divert the flushing gas in order to achieve a uniform flow through the gap.

Window glazing of this kind is used in motor vehicles and airplanes subject to special climatic conditions during operation. This type of window glazing, which exhibits two or more panes, has become known in particular in airplanes. The panes in such window glazing can be provided on the sides facing the gap 2 with a transparent coating, whose degree of transmission can be altered by varying electrical or electrochemical parameters. Know in particular are coatings whose transmission changes as a function of the hydrogen content of the atmosphere tangent to the coating.

For a dual pane with ventilated gap 2, this means that the flushing gas 5 for the gap 2 must have an adjustable content of hydrogen.

As a rule, a portion of the prepared feeding air 8 is used as a basis for the flushing gas 5, which is linked by a line system 6 with the openings 3 for feeding the flushing gas into the gap 2.

At the entry end, the line system 6 is connected with a mixing device 10. The mixing device exhibits two entries, one for the feeding air 8, and another for the gas ($H_2$) to be added, e.g., hydrogen. The latter is best connected via a regulator 10 with the gas-generating device 9. The regulator 10 enables the metered admixing of hydrogen gas as a function of the feeding air B relayed into the mixing device 7. The line system 6 is further used to supply other window glazing of the same type with the identical flushing gas 5.

Various designs have become known for the hydrogen gas generating devices. For example, the system already present on board for generating oxygen for the cabin air can be used for this purpose on an airplane (referred to as OBOGS, onboard oxygen generating system). Hydrogen gas is here generated as the waste product of the oxygen generation, so to speak. However, other oxygen systems for cabin air can also be used for this purpose, since OBOGS is only an optional system.

Figure 2:
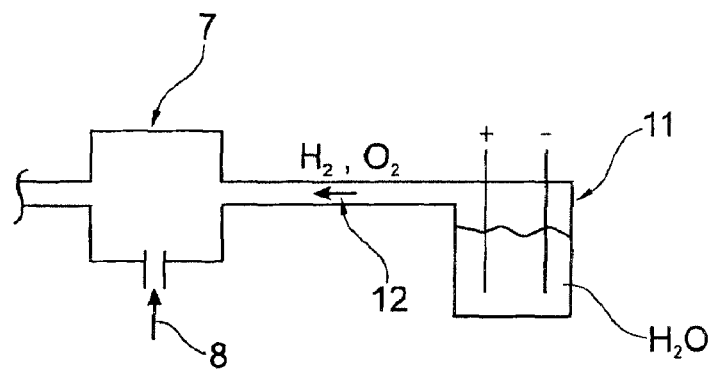
FIG. 2 is the use of an electrolyte cell in a device according to FIG. 1.

One special way for generating hydrogen gas is to use an electrolyte cell 11 shown in FIG. 2. In the simplest case, the gases hydrogen and oxygen generated via the electrolysis of water ($H_2O$) are relayed to the mixing device 7 through a shared line 12, and there mixed with the feeding air 8. As a rule, the stream of feeding air 8 is kept constant, but can be adjusted accordingly to suit requirements.

Figure 3:
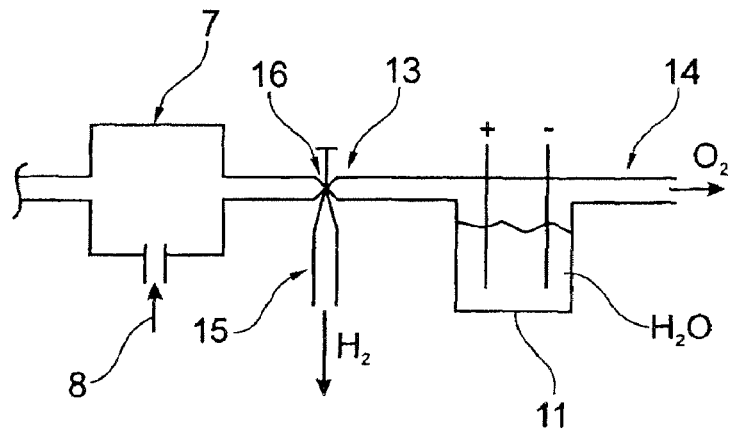
FIG. 3 is the regulation of the gas quantity that was generated by an electrolyte cell and can be supplied to the device according to FIG. 1.

FIG. 3 shows an advantageous solution involving the use of an electrolyte cell 11 with two outgoing lines 13, 14 for the separately generated gas streams hydrogen and oxygen. While the oxygen portion is supplied via line 14 to another application not described in more detail here, the generated hydrogen portion flows via line 13 to a valve 16. The latter is designed as a 3-way valve in the exemplary embodiment. It makes it possible to precisely meter the hydrogen gas quantity fed to the mixing device. The excess residual quantity of hydrogen gas is fed to another application or purged via another line 15. The feeding air 8 and metered quantity of hydrogen gas is mixed in the same way as in the exemplary embodiment shown on FIG. 2.

Figure 4:
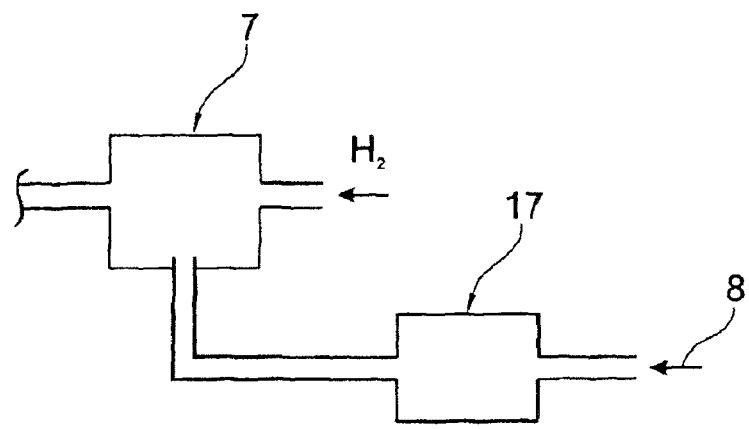
FIG. 4 is a drying device in the feed line of the air portion in the flushing gas.

FIG. 4 shows another beneficial enhancement to the previously described process of preparing the flushing gas. Since it must generally be assumed that the feeding air 3 has a fairly significant content of water vapor, it is appropriate that a device 17 be used to dry the feeding air 8 in the line that supplies the feeding air 8 to the mixing device. As a result, the amount of water introduced in the gap 2 of the window glazing can be reduced considerably.

Figure 5:
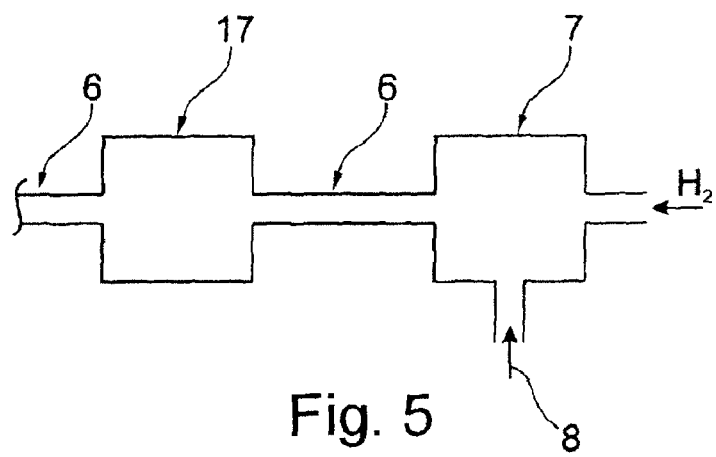
FIG. 5 is a drying device in the feed line of the hydrogen portion in the flushing gas.

As an alternative, the device 17 for drying the gas mixture can also be incorporated in the line section from the mixing device 7 to the gap 2. FIG. 5 shows this in simplified form.

Figure 6:
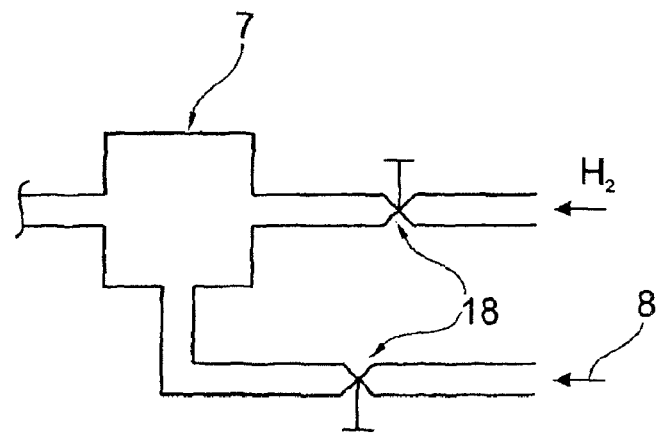
FIG. 6 is the arrangement of an additional regulator in a device according to FIG. 1.

Another advantageous embodiment of the invention is shown on FIG. 6. This relates to the arrangement of regulators 18 in at least one of the gas/air $H_2$ feed lines 8 to the mixing device 7. As a result, the quantity of flushing gas for the window glazing along with its percentage composition of air and admixed gases can be very precisely metered. This is of crucial importance in particular for effectively limiting contamination and condensing water entry into the gap 2 of the window glazing.

Figure 7:
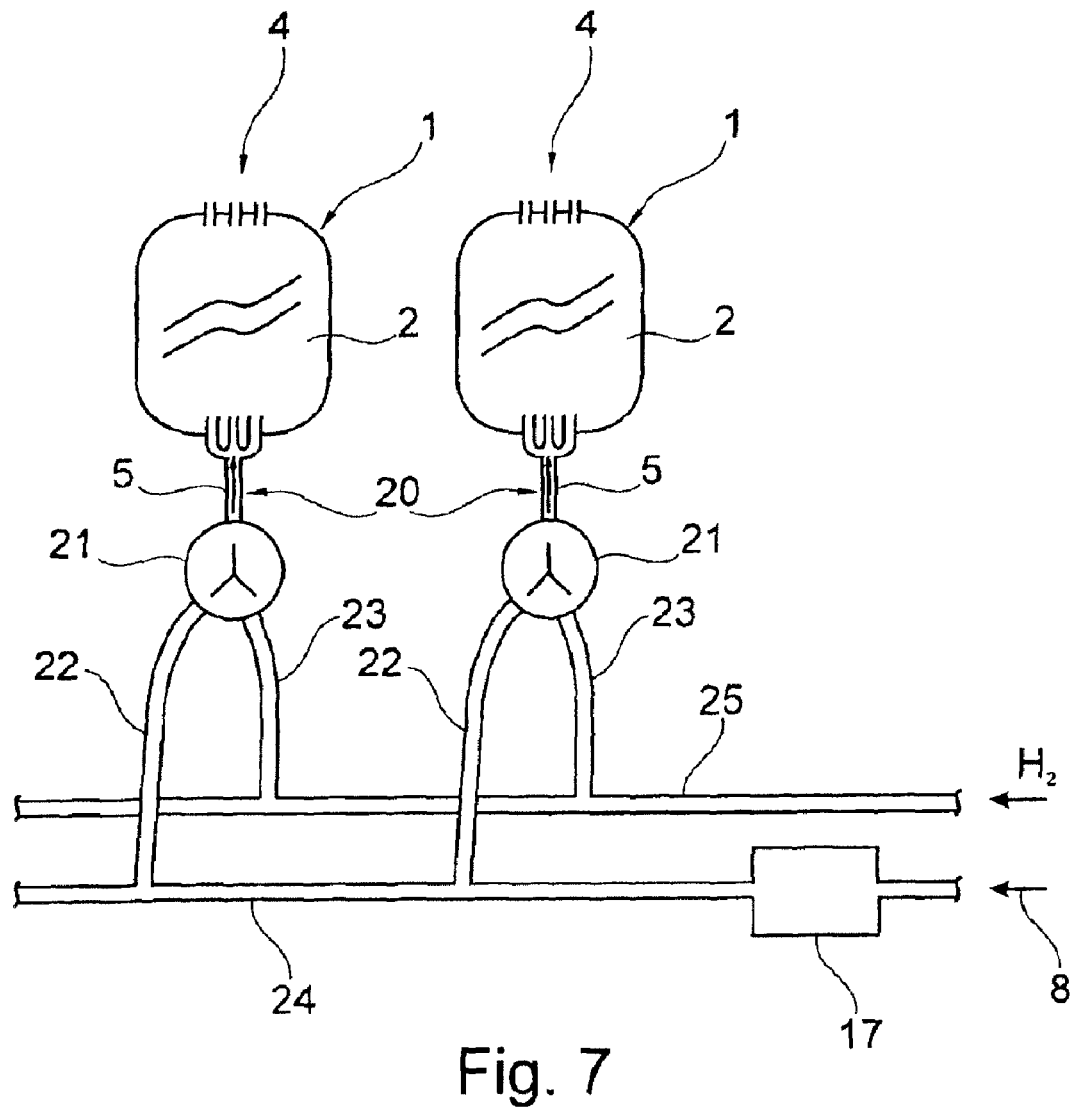
FIG. 7 is another device for supplying dual glazings with a flushing gas consisting of two components.

Finally, FIG. 7 shows an alternative solution to the design shown on FIG. 1. The arrangement here depicts two window glazings 1, wherein these are only presented as an example for a plurality of identical window glazings. The completely mixed and metered flushing gas 5 is fed to each of the gaps 2 in the window glazing 1 via lines 20. These lines 20 are each connected with the outputs of a regulator 21. The separated inputs of the regulator 21 are each connected with feed lines 24, 25 for the feeding air 8 and the second gaseous component of the flushing gas, here hydrogen $H_2$. If needed, a device for drying the additional air can be integrated in the feed line 24 for the additional air 8.

The invention claimed is:

1. A motor vehicle or an aircraft, comprising:
   an oxygen-generating system for generating oxygen for an air cabin;
   a window glazing comprising:
      at least two panes, each pane having an inside and an outside;
      a ventilated gap formed between the panes; and
      a layer with a controllable transmission formed on the inside of at least one pane;
   wherein the gap is connected with a line system for feeding a flushing gas,
   the flushing gas consists of at least two components, and the line system is connected to a mixing device with which the composition of the flushing gas can be adjusted as needed,
   wherein the flushing gas consists of a mixture of air and at least one of hydrogen or oxygen; and
   wherein the at least one of hydrogen or oxygen is generated by the oxygen-generating system located on board of the motor vehicle or aircraft.

2. The motor vehicle or aircraft according to claim 1, wherein the mixing device comprises a controllable valve in at least one gas feeding line.

3. The motor vehicle or aircraft according to claim 1, wherein a device for drying the gas mixture is arranged in the line system feeding-air to the mixing device or in the line system to the window glazing.

4. The motor vehicle or aircraft according to claim 1, wherein the line system comprises an air feeding line and an hydrogen feeding line and wherein a regulator for the gas stream is arranged in at least one of the air feeding line or the hydrogen feeding line.

5. A motor vehicle or an aircraft, comprising:
   an oxygen-generating system for generating oxygen for an air cabin;
   a window glazing comprising:
      at least two panes with a ventilated gap, wherein an inside of at least one of the panes is provided with a layer with a controllable transmission, and wherein the gap is connected with a line for feeding a flushing gas, the line comprises a regulator that includes separate lines for feeding air and for another gas, the regulator can be used to adjust the mixing ratio between the feeding air and the other gas and/or the throughput of flushing gas, wherein the flushing gas consists of a mixture of air and at least one of hydrogen or oxygen; and wherein the at least one of hydrogen or oxygen is generated by the oxygen-generating system located on board the motor vehicle or the aircraft.

6. The motor vehicle or aircraft according to claim 5, wherein a device for drying the additional air is arranged in the line for feeding air to the regulator.

* * * * *

UNITED STATES PATENT AND TRADEMARK OFFICE
CERTIFICATE OF CORRECTION

PATENT NO. : 7,972,021 B2
APPLICATION NO. : 11/990863
DATED : July 5, 2011
INVENTOR(S) : Thomas Scherer It is certified that error appears in the above-identified patent and that said Letters Patent is hereby corrected as shown below:

In the Specifications:

Col. 3, Line 62, "feeding air 3" should read --feeding air 8--.

Signed and Sealed this
Ninth Day of July, 2013

Teresa Stanek Rea
*Acting Director of the United States Patent and Trademark Office*